H. J. ZIMMERMAN.
VALVE GASKET.
APPLICATION FILED JULY 28, 1919.
1,438,161.
Patented Dec. 5, 1922.
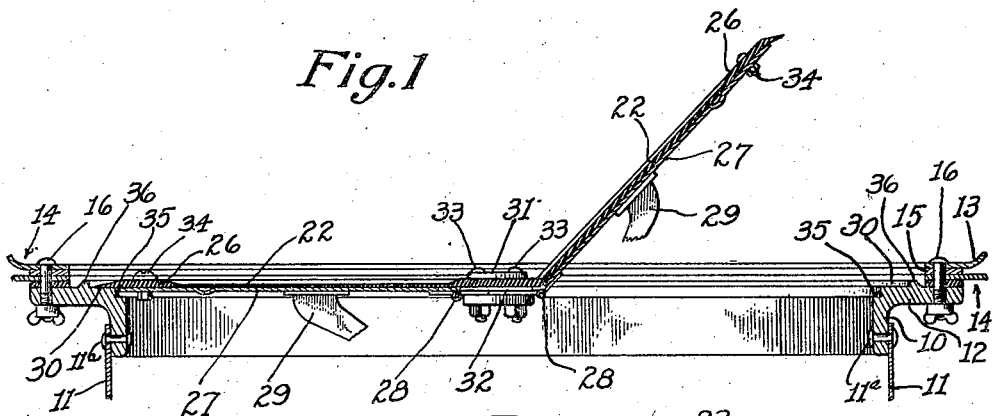
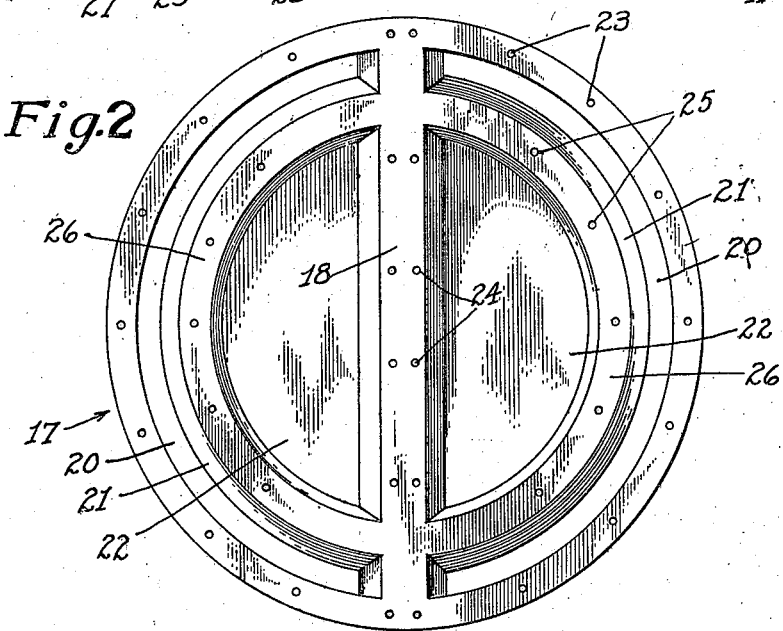
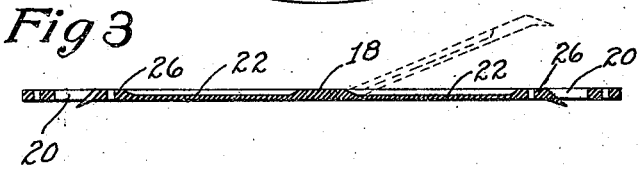
Inventor
Henry J. Zimmerman Patented Dec. 5, 1922.

1,438,161

UNITED STATES PATENT OFFICE.

HENRY J. ZIMMERMAN, OF AKRON, OHIO, ASSIGNOR TO THE GOODYEAR TIRE & RUBBER COMPANY, OF AKRON, OHIO, A CORPORATION OF OHIO.

VALVE GASKET.

Application filed July 28, 1919. Serial No. 313,901.

*To all whom it may concern:*

Be it known that I, HENRY J. ZIMMERMAN, a citizen of the United States, and resident of Akron, Ohio, have invented new and useful Improvements in Valve Gaskets, of which the following is a specification.

My invention relates to a gasket and has particular reference to a molded gasket that acts as the sealing medium of an air valve.

Gaskets for analogous purposes are well known in the art but they are usually so constructed that they move as an entity, all the parts thereof remaining in the same plane. Such gaskets, however, have a tendency to leak and if used at a joint, must be supplemented by another, the function of which is to maintain a tight connection.

It is an object of my invention to provide a one-piece gasket which will not only serve as a leakless packing gland, but will act as the valve or double valve as well.

A further object of my invention is to provide a gasket which is operated by flexing it at its diameter so that it functions as a pair of flap valves, which may operate individually or simultaneously.

Other objects and advantages will appear as the description proceeds, and the invention will be more particularly pointed out in the claims.

In the drawing, wherein I have illustrated the preferred embodiment of my invention:

Figure 1 is a median section of a valve showing the gasket in operative position;

Figure 2 is a plan view of the gasket; and

Figure 3 is a median section through the diameter of the gasket.

Referring now to the drawing, the numeral 10 designates a valve casing, which for the purpose of better illustrating the use of my invention, I have shown, as a part of a so-called "air damper valve," such as used in the tube or conduit leading to the ballonnets of a dirigible, the sidewall 11 of the tube, preferably of aluminum, being connected to the casing 10, by studs or other suitable devices 11ª. To a flanged portion 12 of the casing 10 are secured a frame 13 of a ballonnet and the envelope of the aircraft designated generally as 14, which are held in place by a metal ring 15 through which studs 16 or similar devices pass for clamping the materials in place.

The gasket, which forms the subject matter of my invention, is designated generally as 17 and is molded preferably substantially circular in shape, and is practically divided into two semi-circular or D-shaped portions, formed by a straight thickened portion 18, extending diametrically across the gasket 17. Segmental apertures or slots 20, semi-circular in extent, are left at each side of the gasket 17, and just inside the edge portion 19 as shown. These apertures 20 extend to the thickened portion 18. The edges 21 of the inside flaps 22 formed by these semi-circular apertures 20, are thickened as at 26 and slightly beveled or tapered to a thin edge to form a lip, which normally project slightly outside the plane of the gasket proper, as shown in Figs. 1 and 3. Three series of bolt holes are provided in the gasket, namely, holes 23 around the outer edge 19, holes 24 across the thickened portion 18, and holes 25 around the thickened portion 26 adjacent the beveled edges or lips 21, for the purpose of receiving bolts, studs or the like, which hold the gasket in place.

In operative position the inside flaps 22 are fastened to two similar plates 27 corresponding in shape to the flaps 22, the plates 27 being sufficiently smaller, so that the beveled edges 21 overhang the same, as shown in Figure 1. The plates 27 are hinged at 28 and are operated by mechanism connected to lugs 29 fixed to said plates, to swing away from the valve seat 30 provided on the inner face of the casing 10. The plates 27 with the gasket attached thereto are held in place by crosspieces 31 and 32 arranged respectively above and below the gasket, the gasket being clamped to the cross pieces 31 and to the plates 27 respectively by studs or bolts 33 and 34 passing through the holes 24 and 25 in the gasket.

A shoulder 35 in the casing 10 receives the outer edges of the plates 27, and a rib 36 receives therewithin the flaps 22 of the gasket.

In operation, the edge 17 of the gasket acts as a leakless packing between the elements in which the gasket is mounted. The two sections 22 are in the nature of separate reinforced flap valves, which are moved to and from their respective seats 30. The overhanging lips 21 constitute also a particular feature of the invention, inasmuch as they first contact with the valve seat 30 so that when the valve is swung to its closed position a positive leakless seal is formed before the plates have reached the limit of their movement, thus insuring always a tight sealing.

Although I have disclosed but a single embodiment of my invention it will be understood that changes in shape or form and in other respects, which fall within the scope of the appended claims, may be made without in any degree departing from the spirit of my invention. For example, the gasket can be made elliptical or of any other desired shape, instead of being circular.

What I claim is:

1. A balloon valve comprising a valve seat, a hinged valve member adapted to engage the valve seat, a gasket overlapping all sides of the valve member, certain of the overlapping portions of the gasket adapted to overlap and seal the union between the valve member and the valve seat and a certain other portion of the gasket extending over and sealing the hinged joint of the valve member.

2. A balloon valve comprising a valve seat, a pair of valve members hinged to a diametrical support, said valve members being adapted to seat on the valve seat, a single gasket extending over and beyond the edges of both valve members and adapted to seal the union between the valve members and the valve seat.

3. A circular flexible gasket, having a diametrical thickened portion dividing said gasket into two substantially equal semi-circles, said gasket being cut on lines conforming to the outer periphery thereof to form a comparatively narrow outer edge, said thickened portion being uncut, whereby two flaps are produced within an uncut edge, said flaps being tapered to a thin knife edge at the outer peripheries thereof.

4. A circular rubber gasket having a materially thickened diametrical strip, dividing said gasket into two substantially equal semi-circles, said gasket having cut therein two semi-annular slots concentric with the circle, and not intersecting said diametrical strip, whereby two flaps are produced which can be flexed about said diametrical strip independently of said uncut edge, said flaps each having a thin lipped edge extending laterally and outwardly relative to the plane of said flap.

In witness whereof, I have hereunto signed my name in the presence of two subscribing witnesses.

HENRY J. ZIMMERMAN.

Witnesses:
JOHN E. KEATING,
E. C. LEADENHAM.